(12) United States Patent
Liao et al.

(10) Patent No.: US 6,736,146 B2
(45) Date of Patent: May 18, 2004

(54) METHOD OF RAPIDLY REWORKING COLOR FILTERS

(75) Inventors: Jiunn-Hsiung Liao, Hsin-Chu (TW); Ching-Chung Chen, Taipei Hsien (TW)

(73) Assignee: United Microelectronics Corp., Hsin-Chu (TW)

( * ) Notice: Subject to any disclaimer, the term of this patent is extended or adjusted under 35 U.S.C. 154(b) by 286 days.

(21) Appl. No.: 09/682,304

(22) Filed: Aug. 16, 2001

(65) Prior Publication Data

US 2003/0034045 A1 Feb. 20, 2003

(51) Int. Cl.$^7$ .................................................. C25F 5/00
(52) U.S. Cl. .............................. 134/1.1; 134/1.2; 134/2; 134/26; 134/42; 134/902; 438/906; 510/175; 510/176; 216/24; 216/57
(58) Field of Search .............................. 134/1.1, 1.2, 2, 134/26, 42, 902; 438/906; 510/175, 176; 216/24, 57

(56) References Cited

U.S. PATENT DOCUMENTS

| | | | | |
|---|---|---|---|---|
| 5,201,960 A | * | 4/1993 | Starov | 134/11 |
| 5,340,619 A | * | 8/1994 | Chen et al. | 427/498 |
| 5,689,318 A | * | 11/1997 | Matsuyama et al. | 349/106 |
| 5,747,387 A | * | 5/1998 | Koizumi et al. | 438/708 |
| 6,228,563 B1 | * | 5/2001 | Starov et al. | 430/327 |
| 6,249,034 B1 | * | 6/2001 | Li | 257/432 |
| 6,379,875 B2 | * | 4/2002 | Chu | 430/329 |
| 6,422,246 B1 | * | 7/2002 | Ku et al. | 134/1.2 |
| 6,566,151 B2 | * | 5/2003 | Yeh et al. | 438/21 |
| 6,566,160 B2 | * | 5/2003 | Yeh et al. | 438/70 |

* cited by examiner

Primary Examiner—Randy Gulakowski
Assistant Examiner—M. Kornakov
(74) Attorney, Agent, or Firm—Winston Hsu

(57) ABSTRACT

A method of removing non-polar colorants of a color filter array rapidly from a bottom layer starts by performing a cracking process to decompose cross-linked polymeric molecules of non-polar R/G/B colorants to smaller fragments. A plasma cleaning process is performed to oxidize the cracked non-polar R/G/B colorants. Then, a solvent cleaning process is performed by using a non-polar solvent to remove the non-polar R/G/B colorants from the bottom layer.

17 Claims, 1 Drawing Sheet

METHOD OF RAPIDLY REWORKING COLOR FILTERS

BACKGROUND OF THE INVENTION

1. Field of the Invention

The present invention relates to a method of rapidly reworking color filters, and more particularly, to a method of completely removing non-polar R/G/B colorants of a color filter array by utilizing a PAD-PI type negative photoresist, plasma clean process and solvent clean process.

2. Description of the Prior Art

A charge-coupled device (CCD) is an optical electronic device used to transform light into an electronic signal. Applications of the charge-coupled device include monitors, transcription machines and cameras etc. However, due to high cost and large dimensions of the charge-coupled device, there are limitations in applications of the charge-coupled device. To overcome the above mentioned drawbacks, a CMOS photodiode is therefore produced. Because the CMOS photodiode is produced by utilizing traditional semiconductor fabrication, the dimensions and production cost of the CMOS photodiode are reduced. Additionally, the CMOS photodiode can be applied in personal computer cameras and digital cameras.

Whether image sensing equipment is composed of a CCD or a CMOS photodiode, incident light must be divided into a combination of rays with different wavelengths, such as red light, blue light and green light. For example, yellow light can be divided into a combination of 50% blue light and 50% green light. As a result, an optical sensing device needs a filtering array to divide incident light. A color filter is made of a photosensitive resin and is patterned by utilizing a photolithography process and an etching process. Then, the color filter is colored by dyes. Directly utilizing a photoresist containing dyes may also serve as the color filter.

As errors occur in fabricating a color filter array, the color filter array needs to be removed completely. Usually, the color filter array is removed by utilizing a plasma cleaning process. However, after the color filter array is aligned in a photolithography process, molecules of dyes in the color filter array perpetrate a cross-linking reaction to form polymers with larger molecular weight. As a result, the color filter array cannot be removed completely by utilizing the plasma cleaning process.

In general, a positive photoresist is removed by utilizing solutions composed of N-methyl-2pyrrolidone (NMP) and acetone, or by utilizing the plasma cleaning process and a solvent cleaning process. Before the color filter array is aligned in a photolithographic process, the color filter array can be removed completely by a color filter array (CFA) development solution. However, after the color filter array is aligned in a photolithographic process, the color filter array cannot be removed completely by the CFA development solution. The color filter array is a negative photoresist, which contributes to a cross-linking reaction in an exposing process. The cross-linked color filter array cannot be removed completely by utilizing the NMP solution, the development solution and the plasma ash cleaning process. As a result, it is necessary to develop a method of completely removing the cross-linked color filter array.

SUMMARY OF THE INVENTION

It is therefore a primary objective of the present invention to provide a method of rapidly removing non-polar R/G/B colorants of a color filter array.

In a preferred embodiment, the present invention provides a method to remove a color filter array rapidly. The color filter array composed of non-polar colorants is formed on a silicon nitride layer. A cracking pre-treatment is performed to decompose cross-linked polymers in the non-polar R/G/B colorants into small molecules. A plasma ash cleaning process is performed subsequently in order to oxidize the non-polar R/G/B colorants. Then, a solvent cleaning process is performed.

It is an advantage of the present invention that a cracking pre-treatment is utilized to decompose the cross-linked polymers in the non-polar R/G/B colorants into small molecules. The cracking pre-treatment utilizes a PAD-PI development solution, which is a negative photoresist development solution comprising methoxy-2-propyl-acetate. The PAD-PI development solution can effectively decompose cross-linked polymers into small molecules, which can be removed by a plasma ash cleaning process and a solvent cleaning process.

These and other objectives of the present invention will no doubt become obvious to those of ordinary skill in the art after reading the following detailed description of the preferred embodiment which is illustrated in the various figures and drawings.

DETAILED DESCRIPTION

Figure 1:
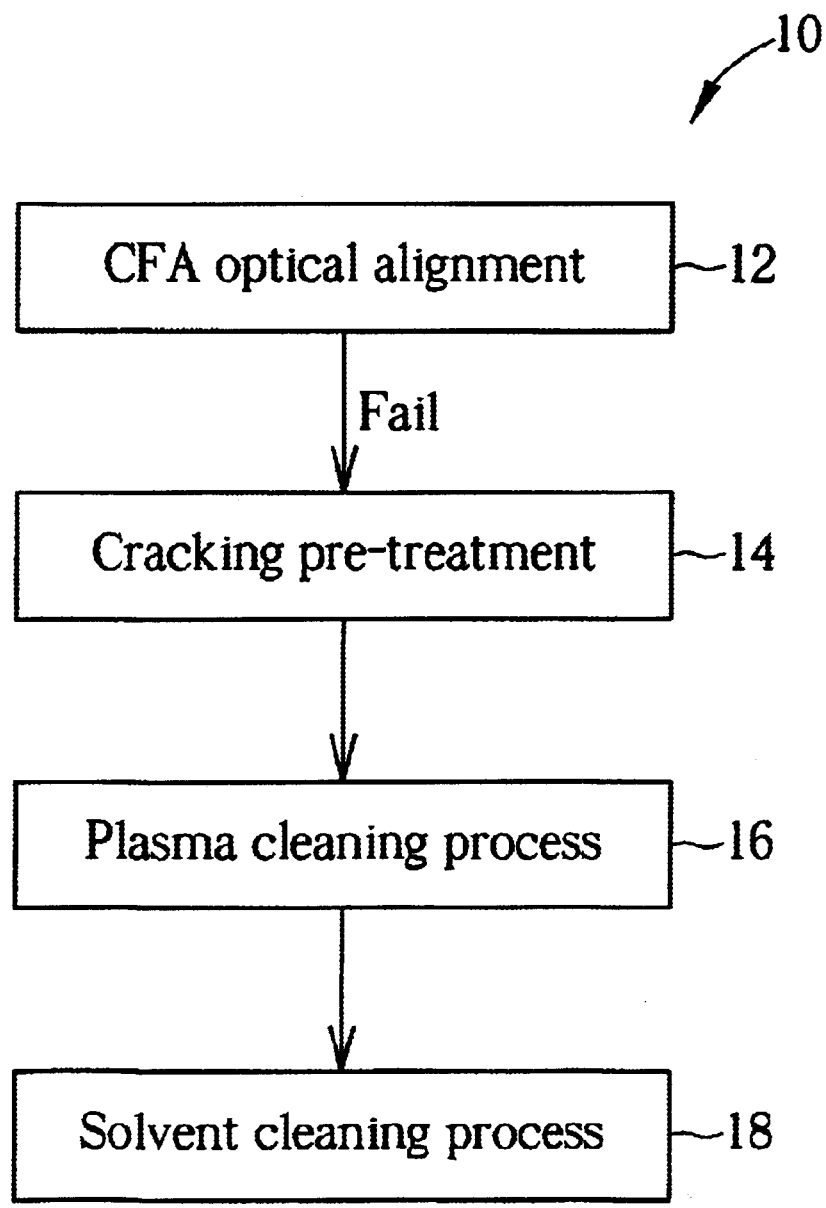
FIG. 1 is a flow chart of removing non-polar R/G/B colorants of a color filter array according to the present invention.

Please refer to FIG. 1. FIG. 1 is a flow chart 10 of a method of removing non-polar R/G/B colorants of a color filter array according to the present invention. The color filter array composed of non-polar R/G/B colorants is formed on a silicon nitride (SiN) layer of a filter. As shown in FIG. 1, a CFA optical alignment 12 of the color filter array is performed. Then, a cracking pre-treatment 14 is performed on the color filter array, which fails in the CFA optical alignment 12. The cracking pre-treatment 14 is utilized in order to decompose cross-linked polymers in the non-polar R/G/B colorants of the color filter array into small molecules. The cracking pre-treatment 14 rinses the color filter array in a non-polar development solution, using a time for rinsing of tens of seconds. A plasma ash cleaning process 16 is performed to oxidize the non-polar R/G/B colorants. Then, a solvent cleaning process 18 is performed to complete the method of removing non-polar R/G/B colorants of a color filter array.

In the present invention, a positive photoresist development solution, a PAD-PI development solution containing methoxy-2-propyl-acetate, and an NMP solution are utilized in the cracking pre-treatment 14. According to experimental results, when utilizing the positive photoresist development solution and the NMP solution, there still exists residue of the color filter array after performing the plasma ash cleaning process 16 and the solvent cleaning process 18. However, when utilizing the PAD-PI development solution, there exists no residue of the color filter array after performing the plasma ash cleaning process 16 and the solvent cleaning process 18.

Because the PAD-PI development solution is a non-polar solution, it can decompose the cross-linked polymers in the R/G/B colorants of the color filter array into small molecules. However, positive photoresist development solution is a polar solution and the NMP solution is between a polar and a non-polar solution and both of them cannot decompose the cross-linked polymers in the R/G/B colorants of the color filter array into small molecules.

As a result, the cracking pre-treatment 14 is the most important step in removing the color filter array. The cracking pre-treatment 14 rinses the color filter array in the PAD-PI development solution. When rinsing time is longer, decomposition of the cross-linked polymers is more complete and it is easier to remove the color filter array. Rinsing time typically ranges between 45 and 100 seconds, optimally 90 seconds. After performing the plasma ash cleaning process 16 utilizing oxygen-containing plasma and the solvent cleaning process 18 utilizing a non-polar solvent of ST26S, the color filter array can be removed completely in a short time. Additionally, the solvent cleaning process 18 can utilize commercial ACT935 or EKC270 cleaning solvent.

The above mentioned color filter array is not covered by a planar layer. Therefore, the cracking pre-treatment 14 and the plasma ash cleaning process 16 only need be performed one time to remove the color filter array completely. However, as the planar layer is coated on the color filter array, the color filter array cannot be completely removed by utilizing the cracking pre-treatment 14 and the plasma ash cleaning process 16 only one time. As a result, the cracking pre-treatment 14 and the plasma ash cleaning process 16 have to be performed more than one time.

A color filter array covered by a planar layer comprises a silicon nitride layer, a color filter array composed of non-polar R/G/B colorants formed on the silicon nitride layer, a planar layer composed of borophosphoslicate glass (BPSG) formed on the color filter array and a micro-lens layer formed on the planar layer. The non-polar R/G/B colorants comprise negative photoresist containing acetate resin.

In the present invention, when the color filter array is covered by the planar layer and the micro-lens layer, the cracking pre-treatment 14 and the plasma ash cleaning process 16 have to be performed more than one time to remove the color filter array completely. First, the cracking pre-treatment 14 is performed. The plasma ash cleaning process 16 utilizing oxygen plasma is performed for about 50 seconds. Then, the cracking pre-treatment 14 and the plasma ash cleaning process 16 are repeated at least one time. Then, the solvent cleaning process 18 utilizing non-polar ST26S solvent is performed. At this point, removal of the non-polar R/G/B colorants, the planar layer and the micro-lens layer is completed. The cracking pre-treatment 14 rinses the color filter array in the PAD-PI development solution containing methoxy-2-propyl-acetate. Rinsing time is between 45 and 100 seconds. As a result, the non-polar R/G/B colorants, the planar layer and the micro-lens layer can be removed in 2.5 hours.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of removing a non-polar R/G/B colorants of a color filter array (CFA) from a bottom layer, the method comprising:
    performing a cracking process to decompose cross-linked polymeric molecules of the non-polar R/G/B colorants to smaller fragment;
    performing a plasma cleaning process to oxidize the cracked non-polar R/G/B colorants; and
    thereafter performing a solvent clean process by using a non-polar solvent to remove the non-polar R/G/B colorants from the bottom layer.

2. The method of claim 1 wherein the non-polar R/G/B colorants comprises a negative photo-resist.

3. The method of claim 1 wherein the non-polar R/G/B colorants comprises the composition of an acetate resin.

4. The method of claim 1 wherein the cracking process comprises the use of a negative photo-resist developer.

5. The method of claim 4 wherein the negative photo-resist developer comprises methoxy-2-propyl-acetate.

6. The method of claim 4 wherein the time of treatment of the cracking process is about 45 seconds to 100 seconds.

7. The method of claim 1 wherein an oxygen plasma is used in the plasma cleaning process for 50 seconds.

8. The method of claim 1 wherein the bottom layer is a silicon nitride layer.

9. A method of reworking a color filter, the color filter comprising a bottom layer and a defined color fitter array composed of a R/G/B colorants on the bottom layer and a planar layer formed on the color filter and micro-lenses formed on the planar layer, the method comprises:
    performing a wet pre-treatment process;
    performing an oxygen plasma clean process;
    repeating the two steps mentioned above for one time at least; and
    performing a non-polar solvent clean process in order to remove the R/G/B colorants on the surface of the bottom layer and the planar layer and the micro-lens layer completely;
    wherein the R/G/B colorants formed on the surface of the bottom layer and the planar layer and the micro-lens layer are removed completely for 2.5 hours.

10. The method of claim 9 wherein the R/G/B colorants comprises the composition of the negative photo-resistor.

11. The method of claim 9 wherein the R/G/B colorants comprises the composition of an acetate resin.

12. The method of claim 9 wherein the substrate is composed of a silicon nitride and the planar layer is composed of the borophosphoslicate. glass (BPSG).

13. The method of claim 9 wherein a wet pre-treatment process comprises, a negative photo-resistor developer.

14. The method of claim 13 wherein the negative photo-resistor developer comprise, methoxy-2-propyl-acetate.

15. The method of claim 9 wherein the time of the wet pre-treatment process is about 45 seconds to 100 seconds.

16. The method of claim 9 wherein the time to perform an oxygen plasma clean process is about 50 seconds.

17. The method of claim 9 wherein the solution to perform the solvent clean process is a non-polar solvent.

* * * * *